(12) United States Patent
Choi

(10) Patent No.: US 7,342,635 B2
(45) Date of Patent: Mar. 11, 2008

(54) LIQUID CRYSTAL DISPLAY PANEL DEVICE AND METHOD OF FABRICATING THE SAME

(75) Inventor: Su Seok Choi, Kyounggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 149 days.

(21) Appl. No.: 10/463,365

(22) Filed: Jun. 18, 2003

(65) Prior Publication Data
US 2004/0109125 A1  Jun. 10, 2004

(30) Foreign Application Priority Data
Dec. 6, 2002  (KR)  .................. 10-2002-0077390

(51) Int. Cl.
*G02F 1/1335* (2006.01)
(52) U.S. Cl. .................................... 349/156
(58) Field of Classification Search ........ 349/155–157, 349/106, 129
See application file for complete search history.

(56) References Cited

U.S. PATENT DOCUMENTS

| 4,720,173 | A | * | 1/1988 | Okada et al. ............... 349/156 |
| 5,978,061 | A | * | 11/1999 | Miyazaki et al. .......... 349/155 |
| 6,020,947 | A |   | 2/2000 | Jones et al. ................. 349/172 |
| 6,266,121 | B1 |   | 7/2001 | Shigeta et al. ............. 349/156 |
| 6,317,188 | B1 | * | 11/2001 | Shibahara ................... 349/155 |
| 6,525,797 | B2 | * | 2/2003 | Tsuda et al. ................ 349/139 |
| 6,667,790 | B2 | * | 12/2003 | Yanagawa et al. ......... 349/139 |
| 6,972,822 | B2 | * | 12/2005 | Miyashita ................... 349/156 |
| 2003/0011738 | A1 | * | 1/2003 | Akiyama et al. .......... 349/156 |
| 2007/0070284 | A1 | * | 3/2007 | Lee et al. ................... 349/153 |

* cited by examiner

*Primary Examiner*—Dung T. Nguyen
(74) *Attorney, Agent, or Firm*—Morgan, Lewis & Bockius LLP

(57) ABSTRACT

A liquid crystal display panel device includes an upper substrate having a plurality of first patterned spacers, and a lower substrate having a plurality of second patterned spacers, wherein the upper and lower substrates are opposed to each other and the first patterned spacers are arternatingly positioned with the second pattern spacers.

24 Claims, 15 Drawing Sheets

PYROMETALLITIC DIANHYDRIDE     DIAMINE

POLYAMIC ACIDS

POLYIMIDE

PHYSICAL IMPACT

INITIAL ALIGNMENT STATE

ALIGNMENT STATE AFTER PHYSICAL IMPACT

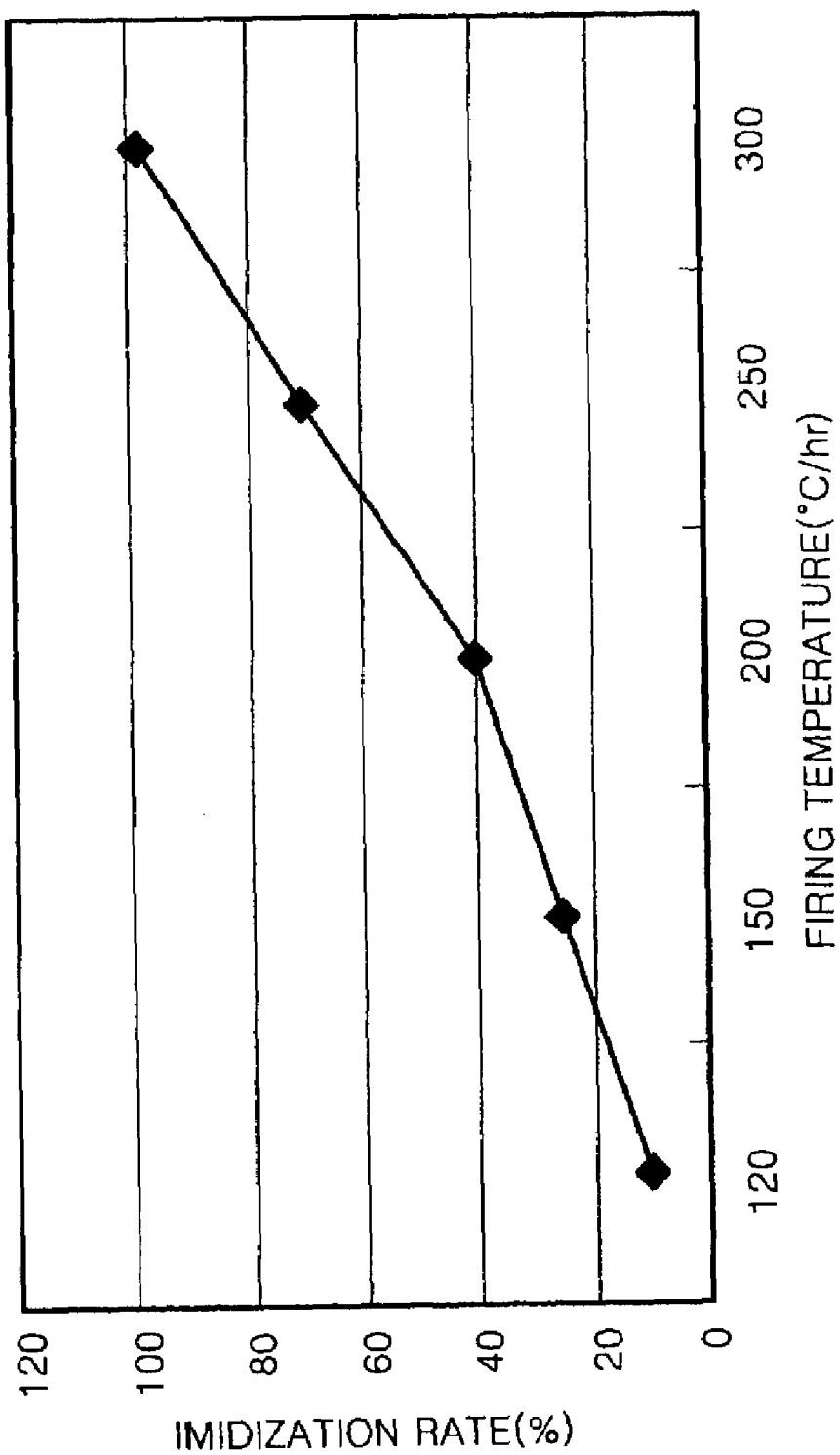

LIQUID CRYSTAL DISPLAY PANEL DEVICE AND METHOD OF FABRICATING THE SAME

The present invention claims the benefit of Korean Patent Application No. P2002-77390 filed in Korea on Dec. 6, 2002, which is hereby incorporated by reference.

BACKGROUND OF THE INVENTION

1. Field of the Invention

The present invention relates to a display device and a method of fabricating a display device, and more particularly, to a liquid crystal display panel device and a method of fabricating a liquid crystal display panel device.

2. Description of the Related Art

In general, liquid crystal display (LCD) devices supply an electric field to a liquid crystal material in response to video signals in order to control an arrangement state of liquid crystal molecules of the liquid crystal material, thereby controlling light transmittance in accordance with the video signal to display an image (i.e., a picture).

FIG. 1 is a perspective view of a spacer pattern of a liquid crystal display panel device according to the related art, and FIG. 2 is a diagram of a rubbing direction of upper and lower alignment films of the liquid crystal display panel device of FIG. 1 according to the related art. In FIGS. 1 and 2, a liquid crystal display panel device includes an upper substrate 2 and a lower substrate 6 formed with patterned spacers 10 therebetween. On the upper substrate 2, there are formed a black matrix (not shown), a color filter (not shown), a common electrode (not shown) and an upper alignment film 4 to cover the patterned spacers 10. On the lower substrate 6, there are formed gate lines (not shown), data lines (not shown) crossing and insulated from the gate lines, thin film transistors (not shown) at intersection areas of the gate lines and the data lines, pixel electrodes (not shown) connected to the thin film transistors, and a lower alignment film 8 to cover the pixel electrodes. The upper and lower substrates 6 are joined together using a sealant to form the liquid crystal display panel device.

The pattern spacers 10 maintain a uniform cell gap between the upper and lower substrates 2 and 6, and are formed as a plurality of stripes along a direction parallel to a rubbing direction of the upper and lower substrates 2 and 6.

FIG. 3 is a plan view of the pattern spacer of FIG. 1 according to the related art, and FIG. 4 is another plan view of the pattern spacer of FIG. 1 according to the related art. In FIGS. 3 and 4, the patterned spacers 10 are formed within at least one of a non-display area of the upper substrate 2, or within a non-display area of the lower substrate 6. For example, the patterned spacers 10 may be formed on the upper substrate 2 to overlap a black matrix 14 that is formed to partition color filters 12 of red R, green G, and blue B, or the patterned spacers 10 may be formed on the lower substrate 6 to overlap at least one of the gate line, the data line, and the thin film transistor.

FIGS. 5A to 5D are cross sectional views of a fabrication method of the liquid crystal display panel device of FIG. 1 according to the related art. In FIG. 5A, patterned spacers 10 are formed on an upper substrate 2. Although not shown, the upper substrate 2 has a color filter array that includes a black matrix, color filters, and common electrodes. A lower substrate 6 is provided to face an upper substrate 2, and includes a thin film transistor array having thin film transistors and pixel electrodes.

In FIG. 5B, an alignment material of polyamic acid state is coated on the lower substrate 6 and the upper substrate 2 where the patterned spacers 10 are formed to form an upper alignment film 4 and a lower alignment film 8. Then, the upper and lower substrates 2 and 6, each respectively having the upper and lower alignment films 4 and 8, are fired at about 150° C.

In FIG. 5C, after the firing process and subsequent to completing a rubbing process, a sealant 16 is formed on at least one of the upper and lower substrates 2 and 6.

In FIG. 5D, the upper substrate 2 and the lower substrate 6 are aligned, bonded together, and then the sealant is hardened at about 200~250° C.

During the hardening process, a chemical hardening reaction, in FIG. 6, is completed to convert the sealant from a polyamic acid to polyimide. Accordingly, the upper and lower alignment films 4 and 8 react with each other at contact areas of the patterned spacers 10, thus the upper and lower alignment films 4 and 8 of the upper and lower substrates 2 and 6 adhere to each other. However, portions of the upper and lower alignment films 4 and 8 stabilize at overlapping areas of the patterned spacers 10, but are both unstable at both side surfaces of the patterned spacers 10. Accordingly, stability is low for external impact applied to the side surface of the patterned spacers 10. In particular, low stability is pronounced in liquid crystal display panel devices having ferroelectric liquid crystal cells, wherein portions of the upper and lower alignment layers 4 and 8 become uneven due to the physical deformation resulting from the external impact.

FIGS. 7A and 7B are diagrams representing an alignment state of ferroelectric liquid crystals of the liquid crystal display panel device of FIG. 1 according to the related art. In FIG. 7A, the liquid crystal display panel device has an even alignment along a rubbing direction, whereas if there is any physical deformation due to external impact, alignment of the ferroelectric liquid crystal molecules, as shown in FIG. 7B, becomes uneven.

SUMMARY OF THE INVENTION

Accordingly, the present invention is directed to a liquid crystal display panel device and a method of fabricating a liquid crystal display panel device that substantially obviates one of more of the problems due to limitations and disadvantages of the related art.

An object of the present invention is to provide a liquid crystal display panel device that is adaptive for increasing stability against external impact.

Another object of the present invention it to provide a method of fabricating a liquid crystal display panel device that is adaptive for increasing stability against external impact.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, and in accordance with the purpose of the present invention, as embodied and broadly described, a liquid crystal display panel device includes an upper substrate having a plurality of first patterned spacers, and a lower substrate having a plurality of second patterned spacers, wherein the upper and lower substrates are opposed to each other and the first patterned spacers are alternatingly positioned with the second pattern spacers.

In another aspect, a method of fabricating a liquid crystal display panel device includes forming a plurality of first patterned spacers on an upper substrate, and forming a plurality of second patterned spacers on a lower substrate opposite to the upper substrate to be arranged alternately with the first patterned spacers.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 15 is a graph representing a polyimide conversion ratio of exemplary upper and lower alignment films of the liquid crystal display panel devices according to the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
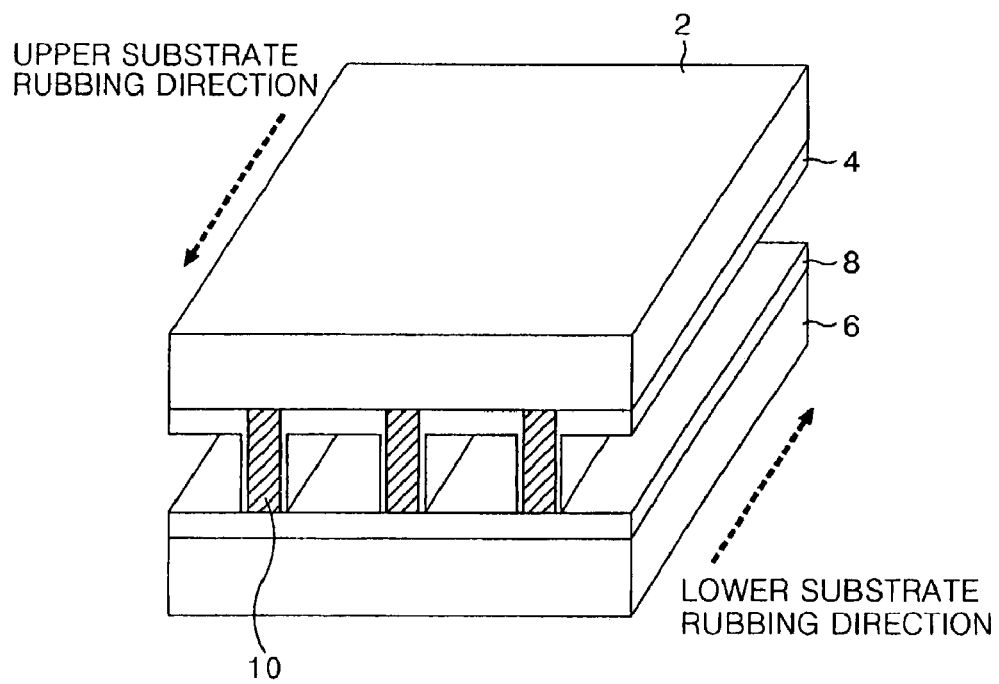
FIG. 1 is a perspective view of a spacer pattern of a liquid crystal display panel device according to the related art.
Figure 2:
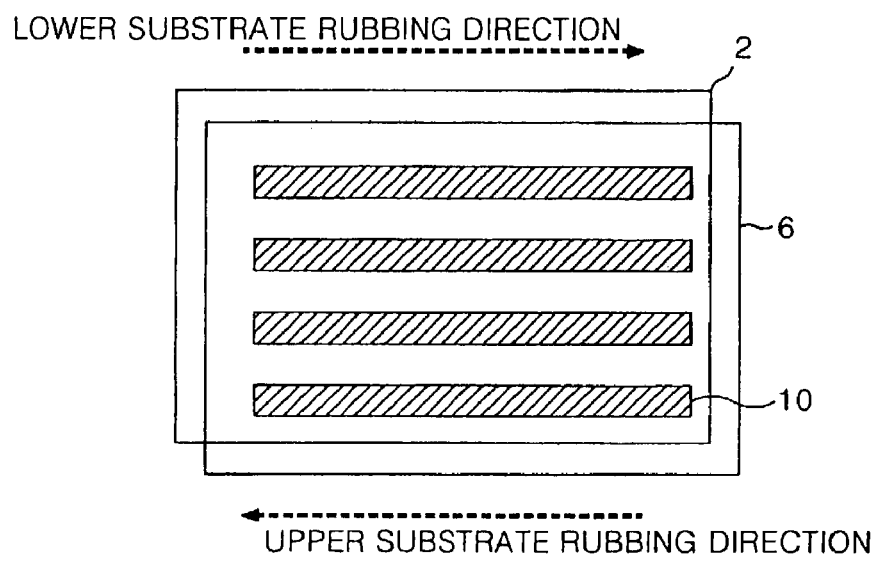
FIG. 2 is a diagram of a rubbing direction of upper and lower alignment films of the crystal display panel device of FIG. 1 according to the related art.
Figure 3:
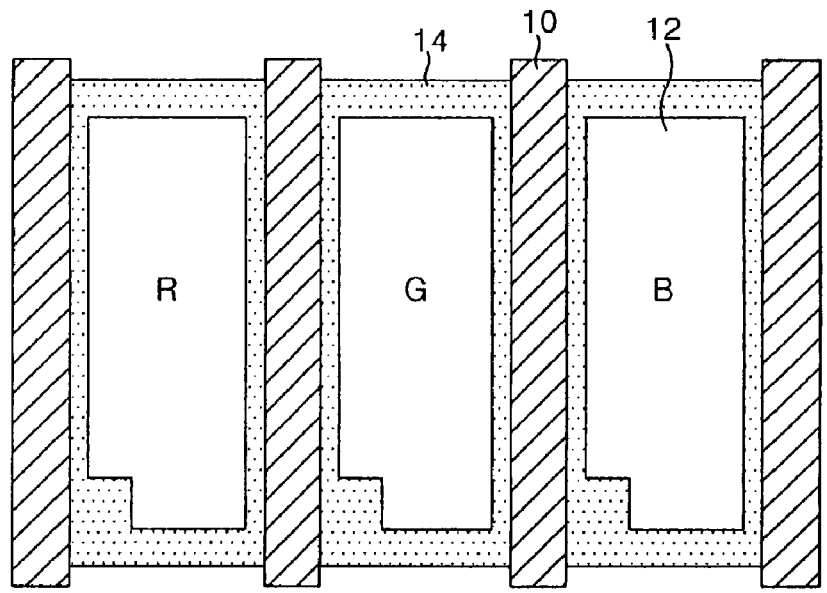
FIG. 3 is a plan view of the pattern spacer of FIG. 1 according to the related art.
Figure 4:
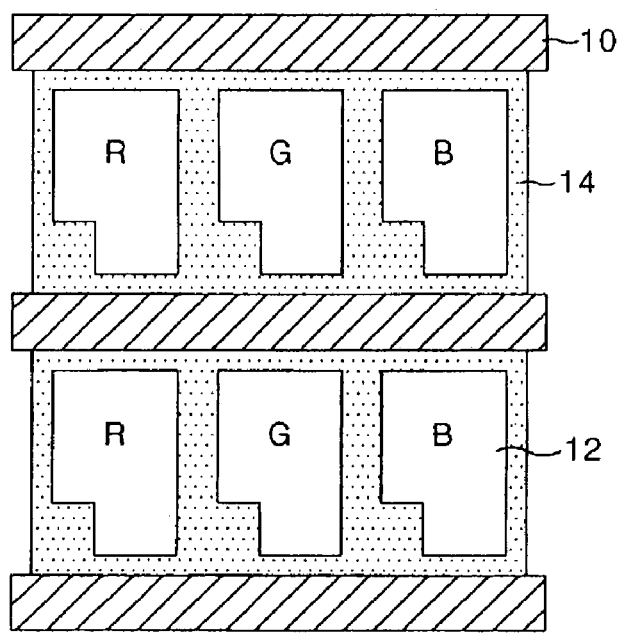
FIG. 4 is another plan view of the pattern spacer of FIG. 1 according to the related art.
Figure 5A:
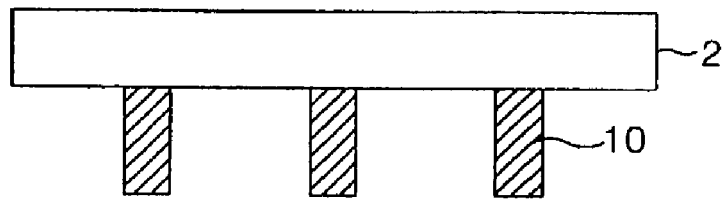
FIGS. 5A to 5D are cross sectional views of a fabrication method of the liquid crystal display panel device of FIG. 1 according to the related art.
Figure 5A:
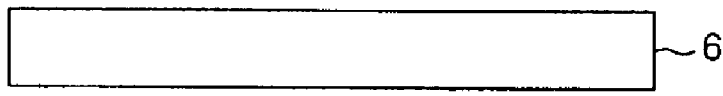
Figure 5B:
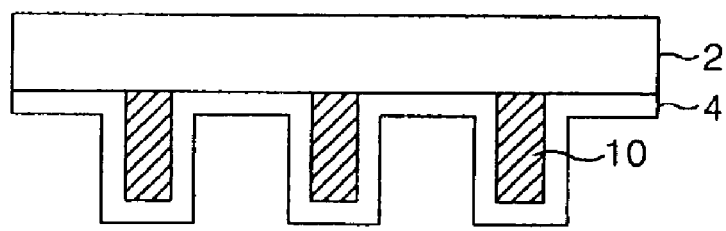
Figure 5B:
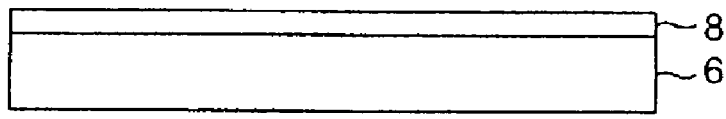
Figure 5C:
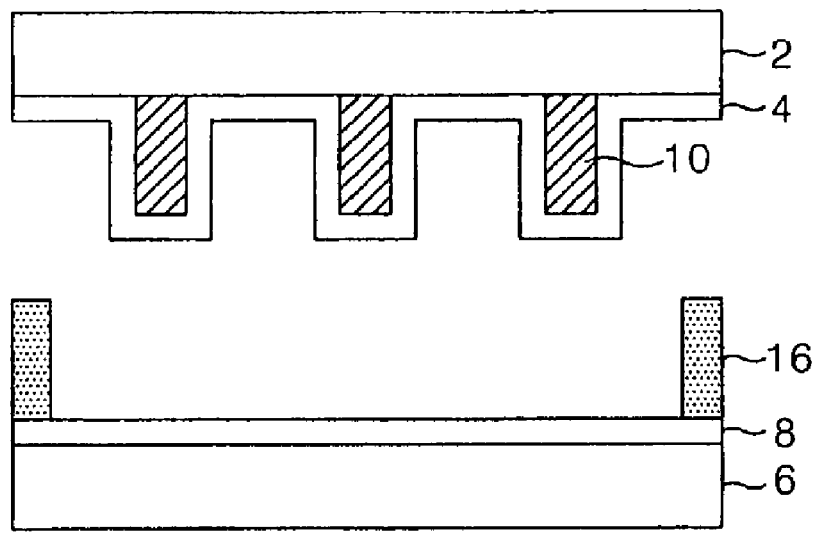
Figure 5D:
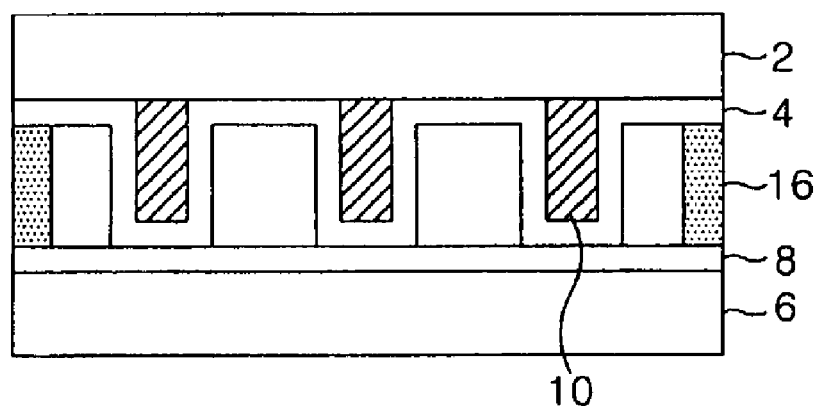
Figure 6:
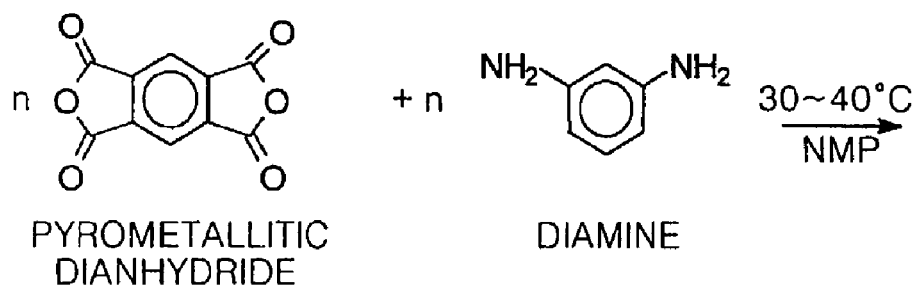
FIG. 6 is a diagram representing a chemical reaction sequence of the upper and lower alignment films of the liquid crystal display panel device of FIG. 1 according to the related art.
Figure 6:
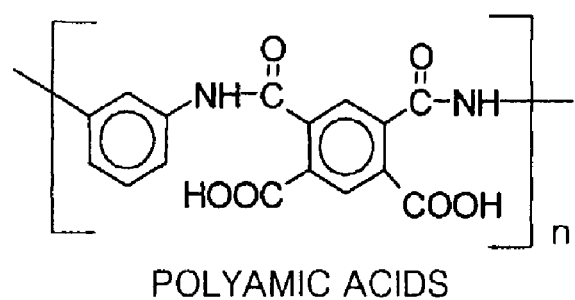
Figure 6:
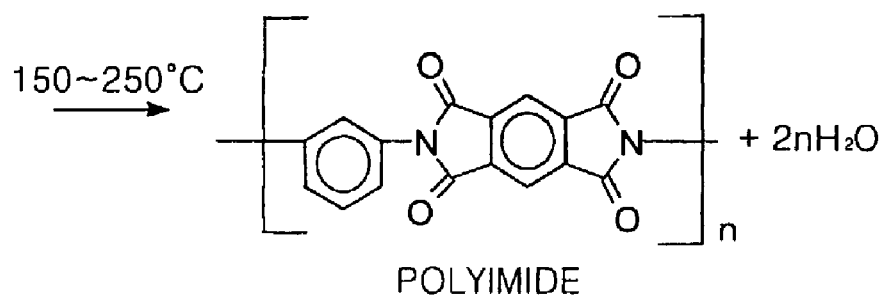
Figure 7A:
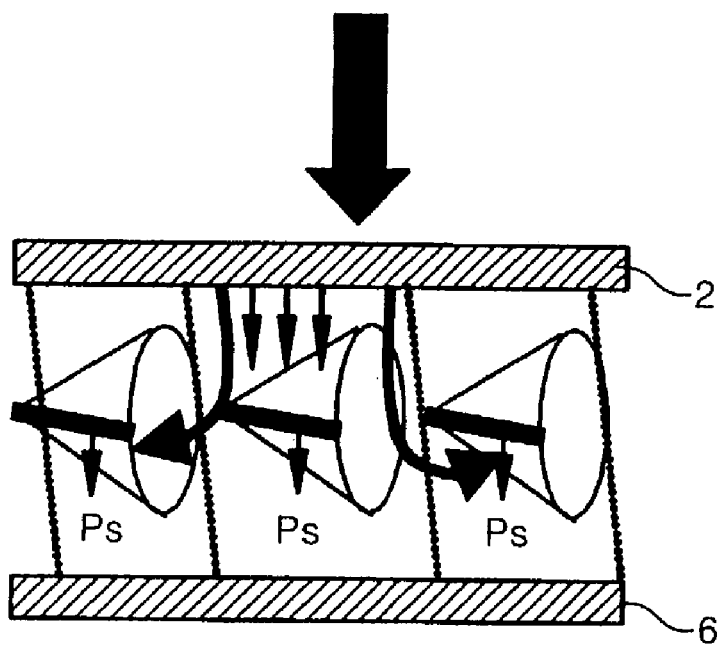
FIGS. 7A and 7B are diagrams representing an alignment state of ferroelectric liquid crystals of the liquid crystal display panel device of FIG. 1 according to the related art.
Figure 7A:
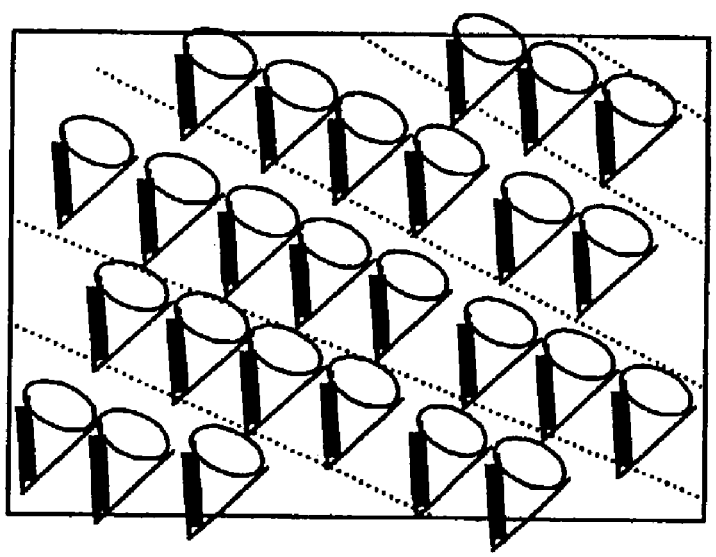
Figure 7B:
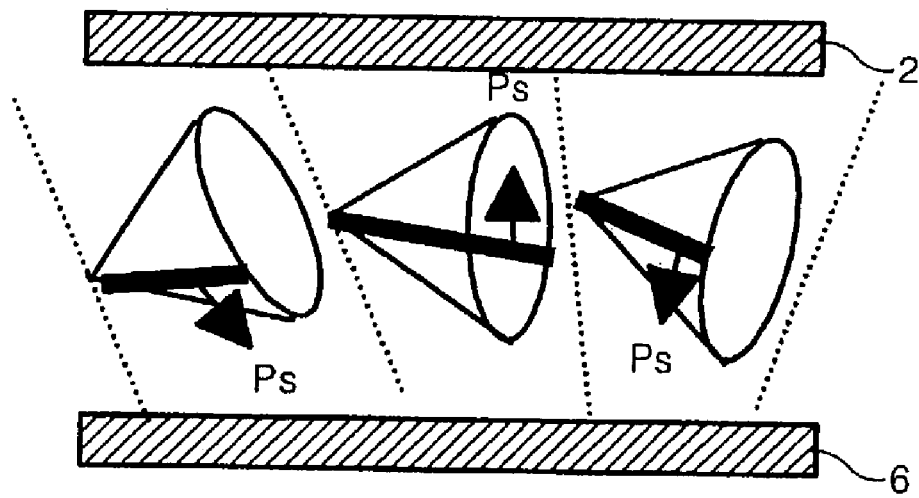
Figure 7B:
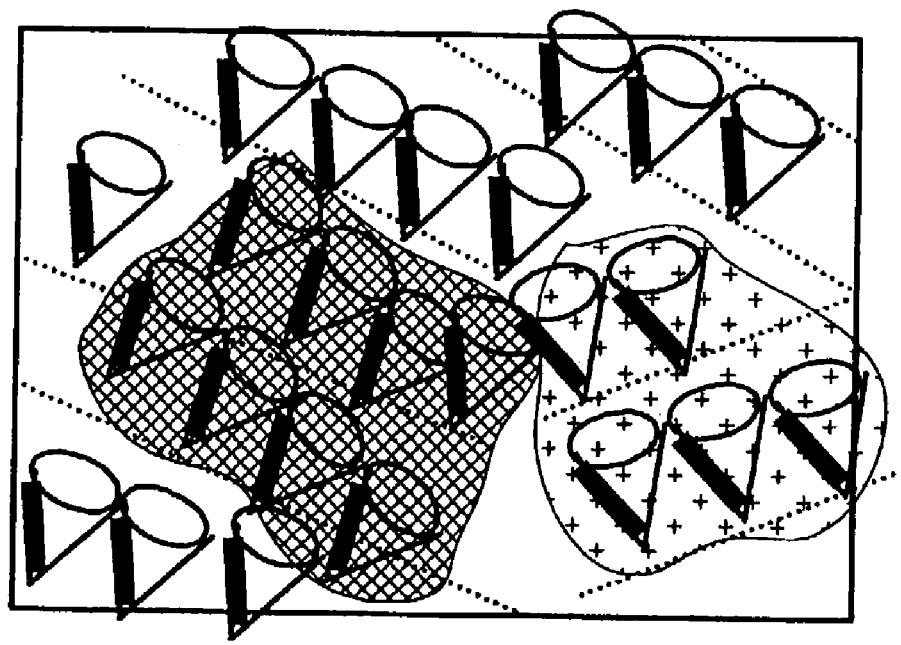
Figure 8:
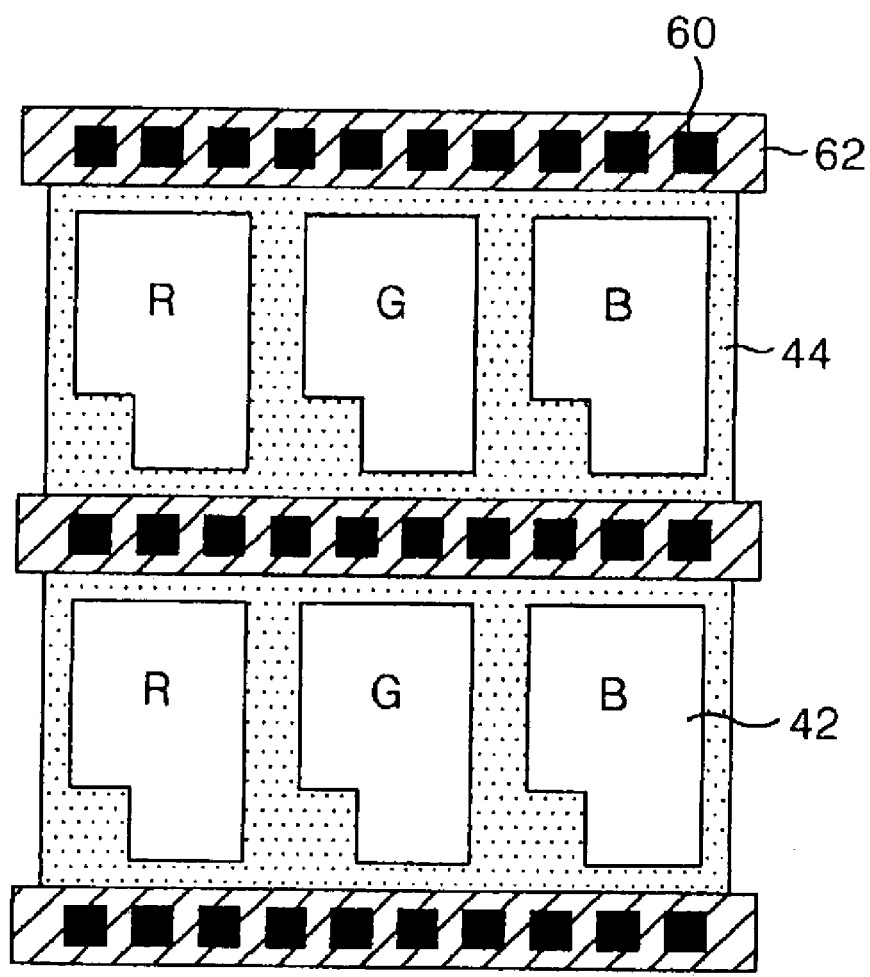
FIG. 8 is a plan view of an exemplary liquid crystal display panel device according to the present invention.

FIG. 8 is a plan view of an exemplary liquid crystal display panel device according to the present invention. In FIG. 8, a liquid crystal display panel device may include a plurality of color filters 42, a black matrix 44 that partitions the color filters 42, and first and second patterned spacers 60 and 62 disposed along a horizontal direction on the black matrix 44. The color filters 42 may be formed within liquid crystal cell areas partitioned by the black matrix 44 to selectively transmit specific wavelengths of light to produce images having red R, green G, and blue B colors. The black matrix 44 may be formed in a matrix configuration on an upper substrate to partition the liquid crystal cells where the color filters 42 are formed to prevent light interference between adjacent ones of the liquid crystal cells.

Figure 9A:
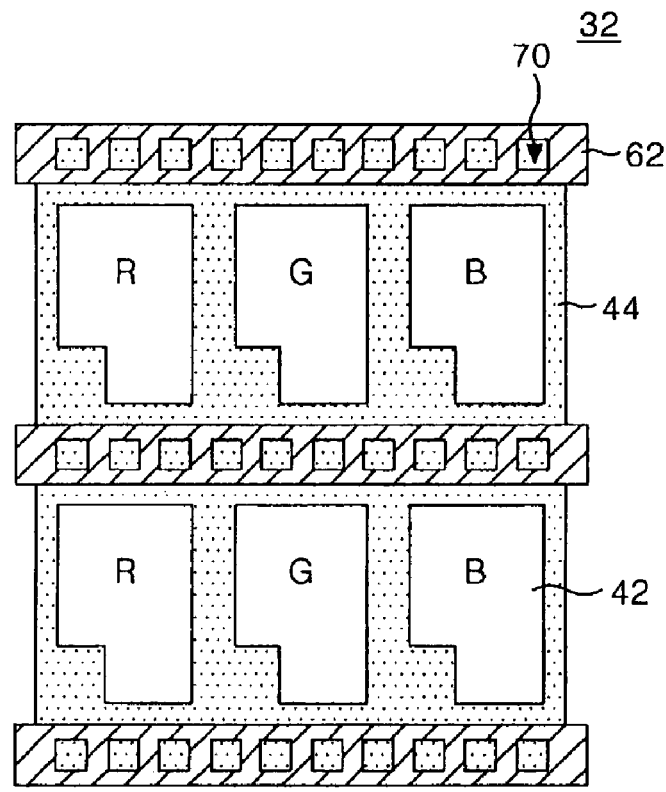
FIGS. 9A and 9B are plan views of exemplary first and second pattern spacers of the liquid crystal display panel device of FIG. 8 according to the present invention.
Figure 9B:
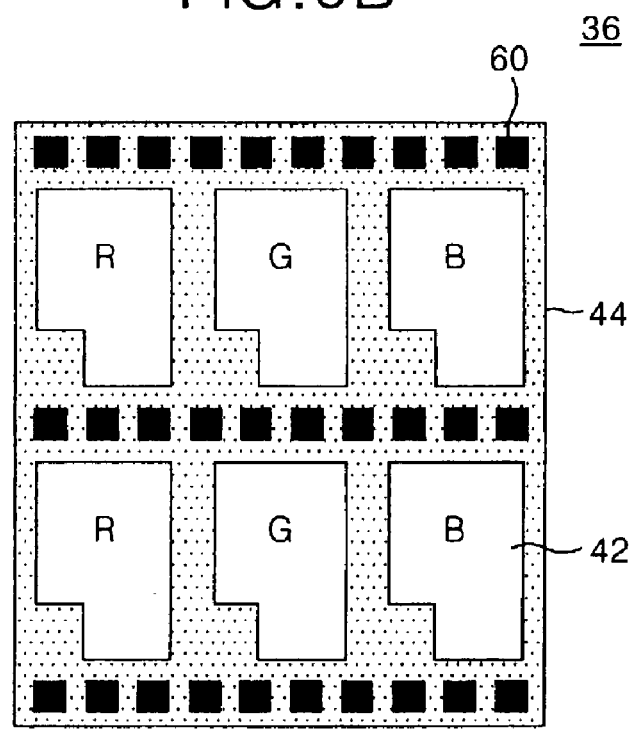

FIGS. 9A and 9B are plan views of exemplary first and second pattern spacers of the liquid crystal display panel device of FIG. 8 according to the present invention. In FIG. 9A, the first patterned spacers 62 may be located on an upper substrate 32 to overlap the black matrix 44. The first patterned spacers 62 may be formed to have a plurality of polygonal holes 70 formed along a line pattern, wherein the holes 70 expose portions of the black matrix 44 that overlap gate lines (not shown) formed on a lower substrate.

In FIG. 9B, the second patterned spacers 60 may be located on the lower substrate 36 to overlap the black matrix 44. The second patterned spacer 60 may be formed to include a plurality of polygonal protrusions that may be inserted into the plurality of polygonal holes 70 of the first patterned spacers 62 (in FIG. 9A).

The first and second patterned spacers 62 and 60 may be formed to each have a width that may be equal to or narrower than a width of the black matrix 44. In addition, the first and second patterned spacers 62 and 60 may be formed to have a height that may be equal to or lower than a liquid crystal cell gap. For example, if a width of the black matrix 44 is about 20~24 μm, then the first and second patterned spacers 62 and 60 may have a width of about 10~20 μm and a height of about 1.3~5 μm. In addition, the first and second patterned spacers 62 and 60 may be formed of acrylic material(s), for example.

Figure 10A:
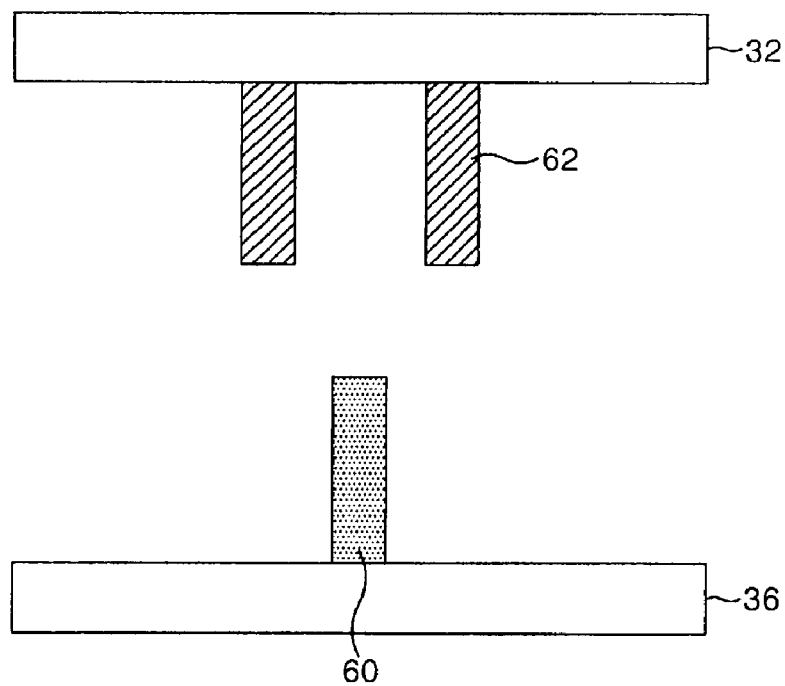
FIGS. 10A to 10D are cross sectional views of an exemplary method of fabricating the liquid crystal display panel shown in FIG. 8 according to the present invention.

FIGS. 10A to 10D are cross sectional views of an exemplary method of fabricating the liquid crystal display panel shown in FIG. 8 according to the present invention. In FIG. 10A, the first patterned spacers 62 may be formed on the upper substrate 32, and the second patterned spacer 60 may be formed on the lower substrate 36.

Figure 10B:
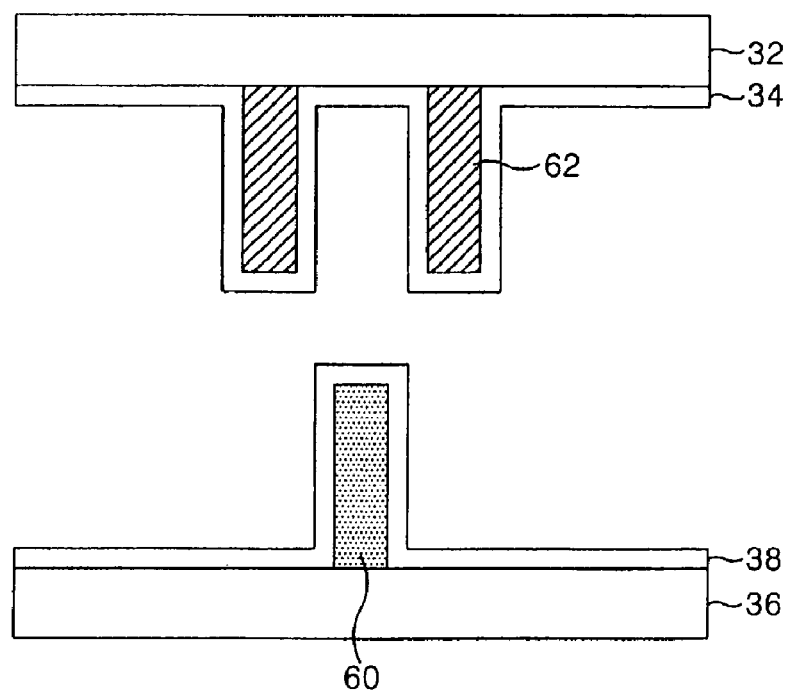

In FIG. 10B, an alignment material of polyamic acid state may be coated on the lower substrate 36 and the upper substrate 32, thereby forming an upper alignment film 34 on the upper substrate 32 and a lower alignment film 38 on the lower substrate 36. Next, the upper substrate 32 and the lower substrate 36 may undergo a first firing process at about 150~200° C., then rubbed to provide an initial alignment for liquid crystal molecules. Accordingly, the upper alignment film 34 and the lower alignment film 38 of polyamic acid state are partially converted into polyimide.

Figure 10C:
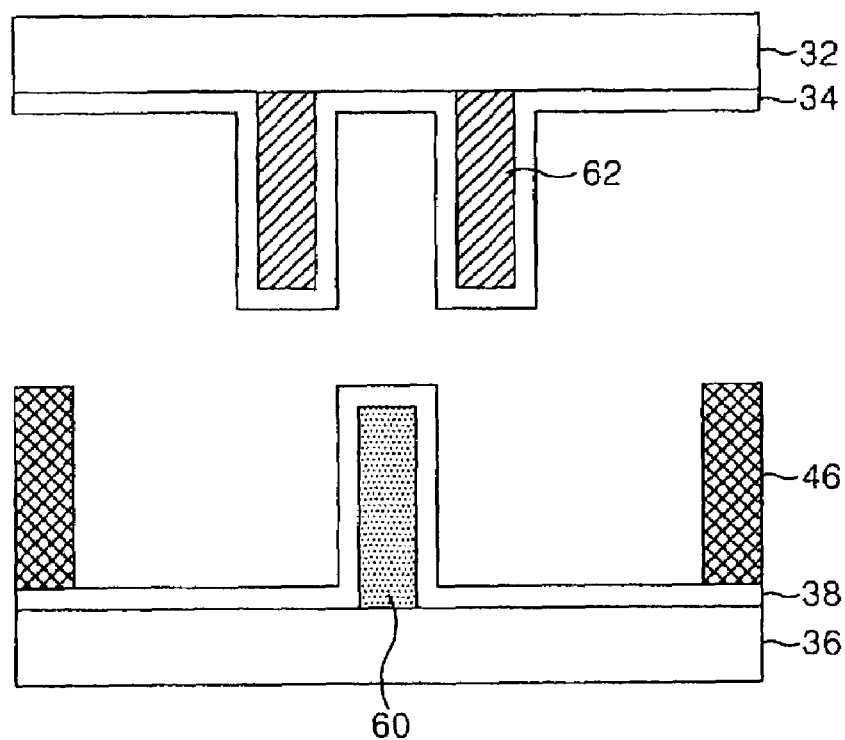

In FIG. 10C, a sealant 46 may be formed on any one of the upper substrate 32 and the lower substrate 36.

Figure 10D:
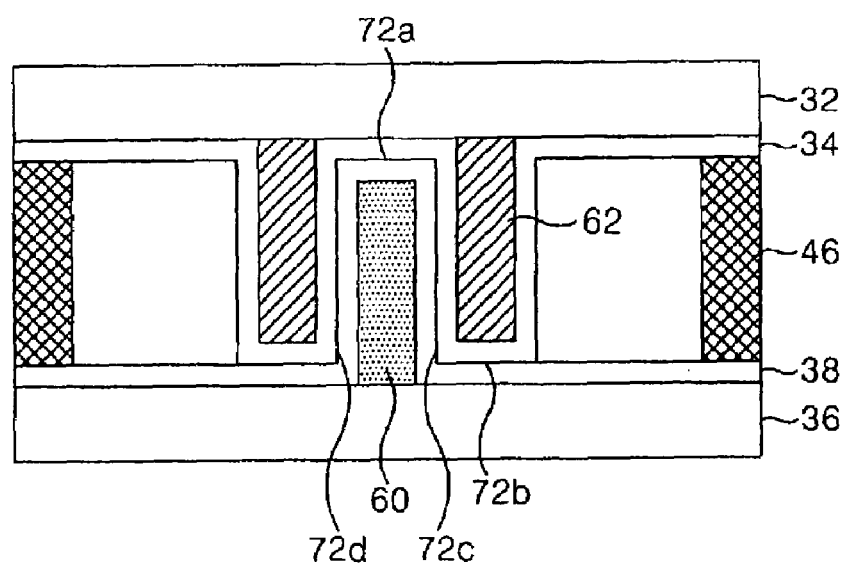

In FIG. 10D, the upper substrate 32 and the lower substrate 36 may be bonded together using the sealant 46 during a second firing process with a temperature and pressure higher than that of the first firing process. For example, the second firing temperature may be about 200~250° C. During the bonding process, the left/right side surfaces 72c and 72d and the top/bottom side surfaces 72a and 72b of the upper alignment film 34 and the lower alignment film 38 formed on the first and second patterned spacers 62 and 60 formed in the upper substrate 32 and the lower substrate 36 respectively, may be combined. The upper alignment film 34 and the lower alignment film 38 having the left/right side surfaces 72c and 72d and the top/bottom side surfaces 72a and 72b may undergo a chemical hardening reaction due to the second firing process, thereby becoming stable.

Accordingly, the liquid crystal display panel has the left/right side surfaces and the top/bottom side surfaces of the upper alignment film and the lower alignment film combined. In addition, the left/right side surfaces and the top/bottom side surfaces of the upper alignment film and the lower alignment film are hardened by chemical reaction, so the liquid crystal display panel device is stabilized from external impact along the top, bottom, left, and right side surfaces.

Figure 11:
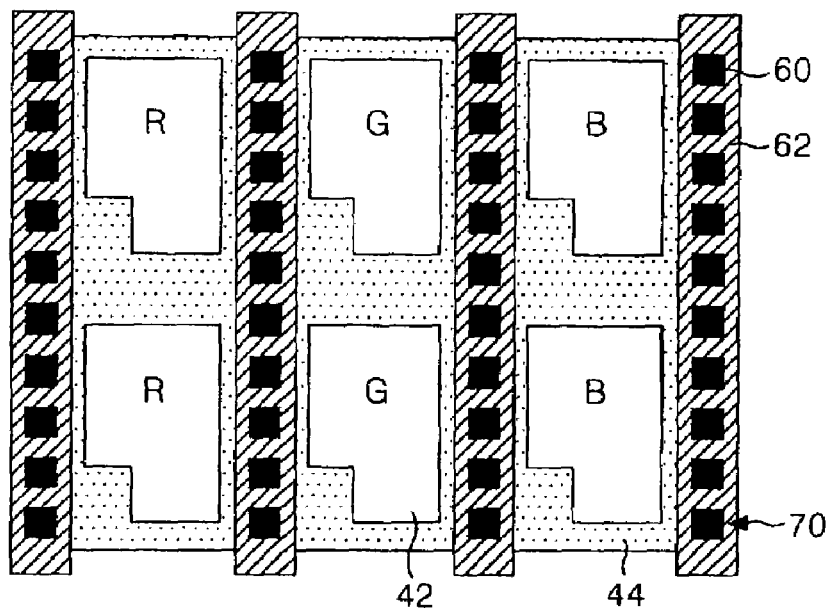
FIG. 11 is a plan view of another exemplary liquid crystal display panel device according to the present invention.

FIG. 11 is a plan view of another exemplary liquid crystal display panel device according to the present invention. In FIG. 11, a liquid crystal display panel may include a plurality of color filters 42, a black matrix 44 partitioning the color filters 42, and first and second patterned spacers 60 and 62 disposed on the black matrix 44. The color filters 42 may be formed within liquid crystal cell areas partitioned by the black matrix 44 to selectively transmit a specific wavelength of light, thereby producing images having red R, green G, and blue B colors. The black matrix 44 may be formed in a matrix configuration on an upper substrate to partition the liquid crystal cells where the color filters 42 may be formed to prevent light interference between adjacent ones of the liquid crystal cells.

The first patterned spacers 62 may be disposed on the upper substrate to overlap the black matrix 44, and may be formed to have a plurality of polygonal holes 70 formed along a line pattern, wherein the holes 70 expose portions of the black matrix 44 that overlap data lines (not shown) that are formed on a lower substrate. An upper alignment film may be formed on the upper substrate provided with the first patterned spacers 62.

The second patterned spacers 60 may be disposed on the lower substrate to overlap the black matrix 44. The second pattern spacers 60 may include a plurality of projections having the same form as the polygonal holes 70 of the first patterned spacers 62. Accordingly, projections of the second patterned spacers 60 may be inserted into the polygonal holes 70 of the first patterned spacers 62. Although not shown, a lower alignment film may be formed on the lower substrate having the second patterned spacers 60, and an upper side surface and left and right side surfaces of the upper alignment film and the lower alignment film may be combined during a bonding process for the upper and lower substrates.

A width the first and second patterned spacers 62 and 60 may be substantially equal to or narrower than a width of the black matrix 44. In addition, a height of the first and second patterned spacers 62 and 60 may be substantially equal to or lower than a liquid crystal cell gap. For example, if a width of the black matrix 44 is about 20~24 μm, a width of the first and second patterned spacers 62 and 60 may be about 10~20 μm and a height of the first and second patterned spacers 62 and 60 may be about 1.3~5 μm. In addition, the first and second patterned spacers 62 and 60 may include acrylic material(s).

An exemplary method of fabricating the liquid crystal display panel device of FIG. 11 may be similar to the exemplary method of fabricating the liquid crystal display panel device of FIGS. 10A-10D, except that the first and second patterned spacers may be formed to overlap the data line. Thus, a detailed description for the exemplary method of fabricating the liquid crystal display panel device of FIG. 11 will be omitted.

The liquid crystal display panel device of FIG. 11 may include combining the left and right side surfaces and the topside surfaces of the upper alignment film and the lower alignment film together, wherein the upper alignment film and the lower alignment film covers the first and second patterned spacers formed on the upper substrate and the lower substrate. Accordingly, the left and right side surfaces and the topside surfaces of the upper alignment film and the lower alignment film are hardened by chemical reaction, so the liquid crystal display panel device is stabilized from external impact along the top, bottom, left, and right side surfaces.

Figure 12:
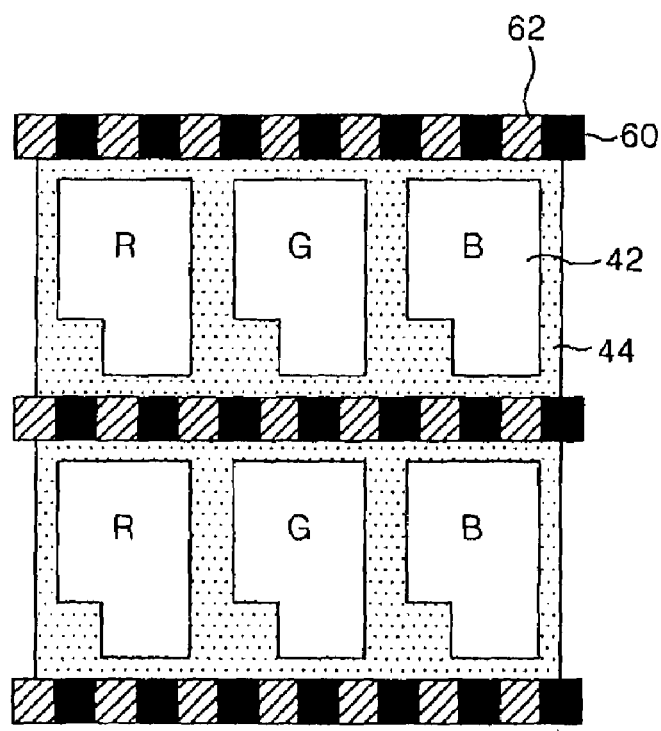
FIG. 12 is a plan view of another exemplary liquid crystal display panel device according to the present invention.

FIG. 12 is a plan view of another exemplary liquid crystal display panel device according to the present invention. In FIG. 12, a liquid crystal display panel device may include a plurality of color filters 42, a black matrix 44 partitioning the color filters 42, and first and second patterned spacers 60 and 62 disposed on the black matrix 44. The color filters 42 may be formed at liquid crystal cell areas partitioned by the black matrix 44 to selectively transmit a specific wavelength of light, thereby producing images having red R, green G, and blue B colors. The black matrix 44 may be formed in a matrix configuration on an upper substrate to partition the liquid crystal cells where the color filters 42 may be formed to prevent light interference between adjacent ones of the liquid crystal cells.

Figure 13A:
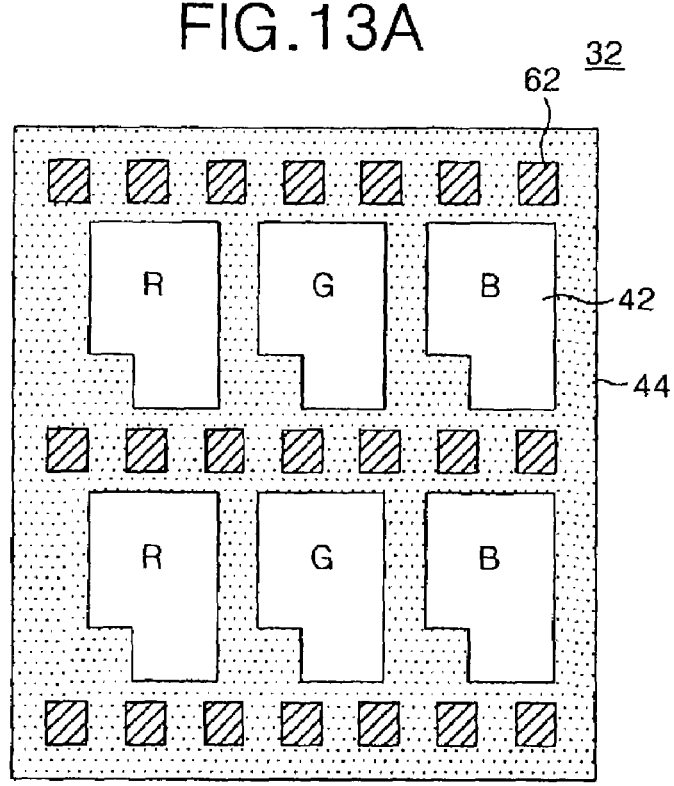
FIGS. 13A and 13B are plan views of exemplary first and second pattern spacers of the liquid crystal display panel device of FIG. 12 according to the present invention.
Figure 13B:
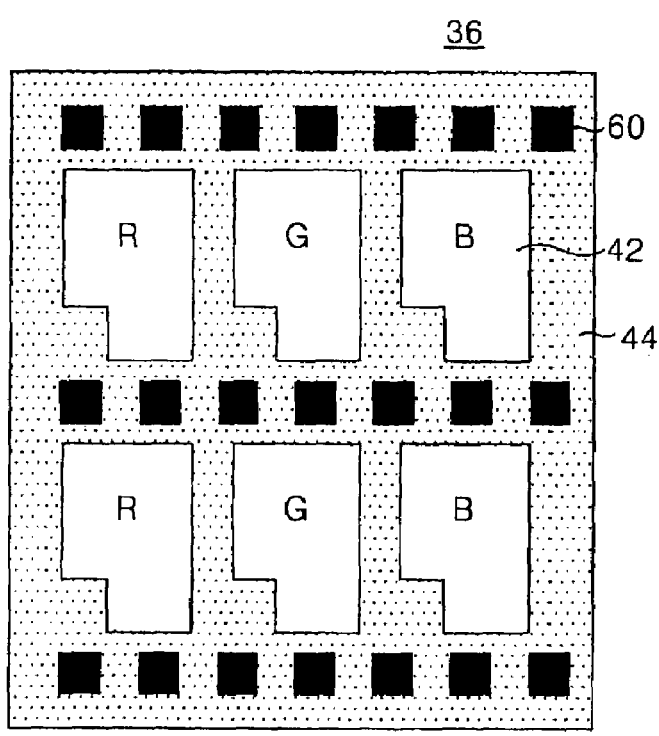

FIGS. 13A and 13B are plan views of exemplary first and second pattern spacers of the liquid crystal display panel device of FIG. 12 according to the present invention. In FIG. 13A, the first patterned spacers 62 may be located on the upper substrate 32 to overlap the black matrix 44, and may be formed in a polygonal pattern with specific gaps therebetween. Accordingly, the polygonal pattern may expose portions of the black matrix 44 that overlap gate lines (not shown) and data lines (not shown) that may be formed on a lower substrate.

In FIG. 13B, the second patterned spacers 60 may be located on the lower substrate 36 to overlap the black matrix 44, and may be formed in a polygonal pattern to be inserted into the specific gaps between the first patterned spacers 62. For example, the first and second patterned spacers 62 and 60 may be alternately formed on the upper substrate 32 and the lower substrate, respectively.

A width of the first and second patterned spacers 62 and 60 may be equal to or narrower than a width of the black matrix 44. In addition, a height of the first and second patterned spacers 62 and 60 may be equal to or lower than a liquid crystal cell gap. For example, if a width of the black matrix 44 is about 20~24 μm, then a width of the first and second patterned spacers 62 and 60 may be about 10~20 μm and a height of the first and second patterned spacers 62 and 60 may be about 1.3~5 μm. In addition, the first and second patterned spacers 62 and 60 may include acrylic material(s).

An exemplary method of fabricating the liquid crystal display panel device of FIGS. 13A and 13B may be similar to the exemplary method of fabricating the liquid crystal display panel device of FIGS. 10A-10D, except that the first and second patterned spacers may be formed in a polygonal shape with a specific gap therebetween. Thus, a detailed description of the exemplary method of fabricating the liquid crystal display panel device of FIGS. 13A and 13B will be omitted.

Figure 14:
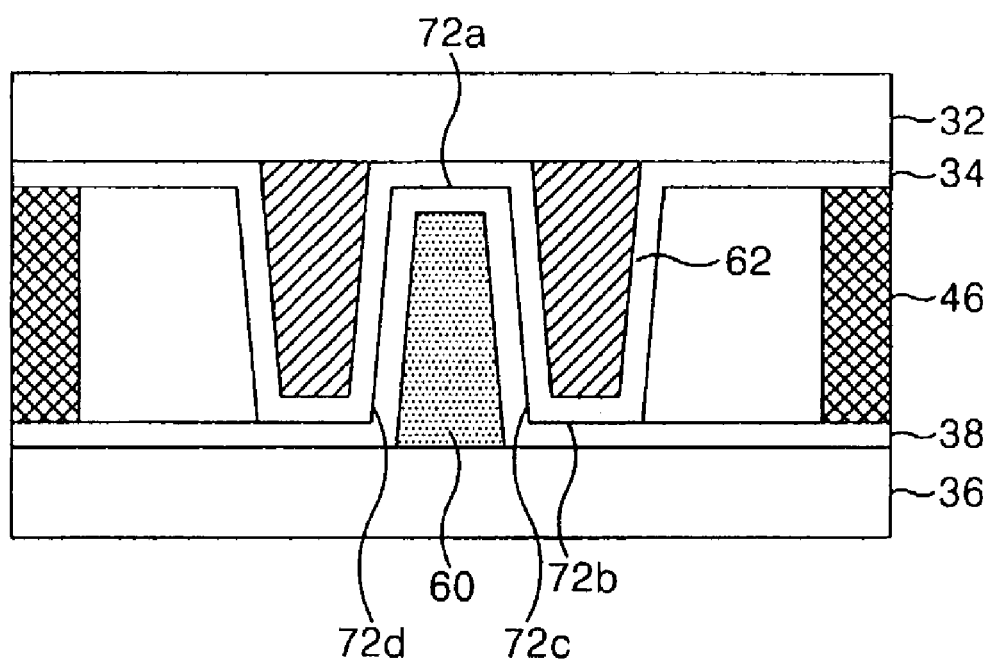
FIG. 14 is a cross sectional view of another exemplary liquid crystal display panel according to the present invention.

FIG. 14 is a cross sectional view of another exemplary liquid crystal display panel according to the present invention. In FIG. 14, a liquid crystal display panel may include first and second patterned spacers 62 and 60 similar to the exemplary first and second patterned spacers of FIG. 11, except that upper portion widths and lower portion widths of the first and second patterned spacers may not be the same.

In FIG. 14, the first patterned spacer 62 may be disposed on an upper substrate 32 to overlap the black matrix to have a trapezoidal shape where a width of the upper portion may be greater than a width of the lower portion. The first patterned spacers 62 may be formed having a trapezoidal shape with specific gaps therebetween, wherein the pattern of the first patterned spacers 62 may expose portions of the black matrix 44 that overlap gate lines (not shown) and data lines (not shown) that may be formed on a lower substrate.

The second patterned spacers 60 may be disposed on the lower substrate 36 to overlap the black matrix to have a trapezoidal shape where a width of the second patterned spacers 60 adjacent to the lower substrate 36 may be greater than a width of the second patterned spacers 60 spaced apart from the lower substrate 36. Accordingly, the second patterned spacers 60 may be inserted into the specific gaps between the first patterned spacers 62.

For example, the first and second patterned spacers 62 and 60 may be alternately formed on the upper substrate 32 and the lower substrate 36, and may be connected along an oblique line shape with the upper and lower alignment film 34 and 38 to cause a contact area of the upper alignment film 34 and the lower alignment film 38 to be relatively wide, thereby increasing stability for external impact.

A width of the first and second patterned spacers 62 and 60 may be equal to or narrower than a width of the black matrix 44, and a height of the first and second patterned spacers 62 and 60 may be equal to or lower than a liquid crystal cell gap. For example, if a width of the black matrix 44 is about 20~24 μm, then a width of the first and second patterned spacers 62 and 60 may be about 10~20 μm and a height of the first and second patterned spacers may be about 1.3~5 μm. In addition, the first and second patterned spacers 62 and 60 may include acrylic material(s).

An exemplary method of fabricating the liquid crystal display panel device of FIG. 14 may be similar to the exemplary method of fabricating the liquid crystal display panel device of FIGS. 10A-10D, except that the first and second patterned spacers may be formed having a trapezoidal shape with a specific gap therebetween. Thus, a detailed description of the exemplary method of fabricating the liquid crystal display panel device of FIG. 14 will be omitted.

FIG. 15 is a graph representing a polyimide conversion ratio of exemplary upper and lower alignment films of the liquid crystal display panel devices according to the present invention. In FIG. 15, the graph represents a "firing temperature to the polyimide conversion ratio" in a condition that an alignment film of the liquid crystal display panel device is left for one hour.

In FIG. 15, the upper alignment film and the lower alignment film of the liquid crystal display panel devices according to the present invention have the conversion ratio from polyamic acid to polyimide as the firing temperature increases, thereby increasing hardening progress. Accordingly, the upper alignment film and the lower alignment film of the liquid crystal display panel devices according to the present invention causes the second hardening to progress at a state that the front surface of the liquid crystal display panel device is heated at the second firing temperature, thus the polyimide conversion ratio is increased. In this way, the liquid crystal display panel devices according to the present invention can control the polyimide conversion ratio in accordance with temperature and the firing process thereof can be progressed by way of dividing the process into two, i.e., before and after bonding the substrates.

The liquid crystal display panel device according to the present invention may be applied to the liquid crystal display panel device including other types of liquid crystal materials, as well as a nematic liquid crystal, a ferroelectric liquid crystal, and an electrical controlled birefringence ECB liquid crystal.

The liquid crystal display panel device and method of fabricating the liquid crystal display panel device according to the present invention has at least two side surfaces of the upper alignment film and the lower alignment film combined together, wherein the upper alignment film and the lower alignment film are formed to cover the first and second pattern spacers that are formed on the upper substrate and the lower substrate. Accordingly, at least two sides of the upper alignment film and the lower alignment film are hardened by chemical reaction, thus the liquid crystal display panel devices are stabilized against external impact for the top, bottom, left, and right side surfaces.

It will be apparent to those skilled in the art that various modifications and variations can be made in the liquid crystal display panel device and method of fabricating a liquid crystal display panel device of the present invention without departing from the spirit or scope of the invention. Thus, it is intended that the present invention cover the modifications and variations of this invention provided they come within the scope of the appended claims and their equivalents.

What is claimed is:

1. A liquid crystal display panel device, comprising:
   a first substrate having a plurality of first patterned spacers; and
   a second substrate having a plurality of second patterned spacers,
   wherein the first and second substrates are opposed to each other, a top side wall of the first patterned spacer is engaged with the second substrate, a top side wall of the second patterned spacer is engaged with the first substrate, and at least one lateral side wall of at least one of the first patterned spacers is engaged with at least one lateral side wall of at least one of the second pattern spacers.

2. The device according to claim 1, wherein the first patterned spacers are formed to overlap a black matrix formed on the first substrate.

3. The device according to claim 2, wherein a width of the black matrix is about 20~24 μm, and widths of the first and second patterned spacers are each about 10~20 μm.

4. The device according to claim 1, wherein the second patterned spacers are formed to overlap at least one of a gate line and a data line on the second substrate.

5. The device according to claim 1, wherein a height of the first and second patterned spacers are each about 1.3~5 μm.

6. The device according to claim 1, wherein at least one of the first and second patterned spacers includes an acrylic material.

7. A liquid crystal display panel device, comprising:
   a first substrate having a plurality of first patterned spacers;
   a second substrate having a plurality of second patterned spacers, wherein the first and second substrates are opposed to each other, a top side wall of the first patterned spacer is engaged with the second substrate, a top side wall of the second patterned spacer is engaged with the first substrate, and at least one of the first patterned spacers is engaged with at least one of the second pattern spacers;

a first alignment film formed on the first substrate to cover the first patterned spacers; and a second alignment film formed on the second substrate to cover the second patterned spacers, wherein at least two substrates of the second alignment film formed on the second patterned spacer contacts the first alignment film formed on the first patterned spacer.

8. A liquid crystal display panel device, comprising:

a first substrate having a plurality of first patterned spacers; and a second substrate having a plurality of second patterned spacers, wherein the first and second substrates are opposed to each other, a top side wall of the first patterned spacer is engaged with the second substrate, a top side wall of the second patterned spacer is engaged with the first substrate, and at least one of the first patterned spacers is engaged with at least one of the second pattern spacers, the first patterned spacers having holes.

9. The device according to claim 8, wherein at least one of the second patterned spacers is inserted into at least one of the holes.

10. A liquid crystal display panel device, comprising:

a first substrate having a plurality of first patterned spacers; and a second substrate having a plurality of second patterned spacers, wherein the first and second substrates are opposed to each other, a top side wall of the first patterned spacer is engaged with the second substrate, a top side wall of the second patterned spacer is engaged with the first substrate, and at least one of the first patterned spacers is engaged with at least one of the second pattern spacers in an alternating pattern.

11. The device according to claim 10, wherein the first and second patterned spacers have a trapezoidal shape.

12. A method of fabricating a liquid crystal display panel device, comprising:

forming a plurality of first patterned spacers on a first substrate;

forming a plurality of second patterned spacers on a second substrate; and attaching the first substrate and the second substrate together such that a top side wall of the first patterned spacer is engaged with the second substrate, a top side wall of the second patterned spacer is engaged with the first substrate, and at least one lateral side wall of at least one of the first patterned spacer is engaged with at least one lateral side wall of at least one of the second pattern spacers.

13. The method according to claim 12, wherein the first patterned spacers are formed to overlap a black matrix formed on the first substrate.

14. The method according to claim 12, wherein the second patterned spacers are formed to overlap at least one of a gate line and a data line on the second substrate.

15. The method according to claim 12, wherein a width of the black matrix is about 20~24 μm, and widths of the first and second patterned spacers are each about 10~20 μm.

16. The method according to claim 12, wherein a height of the first and second patterned spacers is about 1.3~5 μm.

17. The method according to claim 12, wherein at least one of the first and second patterned spacers includes acrylic material.

18. A method of fabricating a liquid crystal display panel device, comprising:

forming a plurality of first patterned spacers on a first substrate;

forming a plurality of second patterned spacers on a second substrate;

attaching the first substrate and the second substrate together such that a top side wall of the first patterned spacer is engaged with the second substrate, a top side wall of the second patterned spacer is engaged with the first substrate, and at least one of the first patterned spacers is engaged with at least one of the second pattern spacers;

forming a first alignment film on the first substrate including the first patterned spacers;

forming a second alignment film on the second substrate including the second patterned spacers; and combining the first alignment film on the first patterned spacers with the second alignment film on the second patterned spacers such that at least two surfaces of the second alignment film formed on the second patterned spacer contacts the first alignment film formed on the first patterned spacer.

19. The method according to claim 18, further comprising:

applying a first firing to the first and second substrates after forming the first and second alignment films; and applying a second firing to combine the first and second alignment films covering the first and second patterned spacers, wherein a temperature of the first firing is equal to or less than a temperature of the second firing.

20. The method according to claim 19, wherein the first firing is at about 150~200° C., and the second firing is at about 200~250° C.

21. A method of fabricating a liquid crystal display panel devices, comprising:

forming a plurality of first patterned spacers on a first substrate;

forming a plurality of second patterned spacers on a second substrate;

attaching the first substrate and the second substrate together such that a top side wall of the first patterned spacer is engaged with the second substrate, a top side wall of the second patterned spacer is engaged with the first substrate, and at least one of the first patterned spacers is engaged with at least one of the second pattern spacers, wherein the first patterned spacers are formed to have holes.

22. The method according to claim 21, wherein at least one of the second patterned spacers is inserted into at least one of the holes.

23. A method of fabricating a liquid crystal display panel device, comprising:

forming a plurality of first patterned spacers on a first substrate;

forming a plurality of second patterned spacers on a second substrate; and attaching the first substrate and the second substrate together such that a top side wall of the first patterned spacer is engaged with the second substrate, a top side wall of the second patterned spacer is engaged with the first substrate, and at least one of the first patterned spacers is engaged with at least one of the second pattern spacers in an alternating pattern.

24. The method according to claim 23, wherein the first and second patterned spacers are formed in a trapezoidal shape.

* * * * *